United States Patent [19]
Arenz

[11] 3,866,726
[45] Feb. 18, 1975

[54] COUPLING WITH TILTABLE ELLIPTICAL DISC

[75] Inventor: Oskar Arenz, Schweinfurt am Main, Germany

[73] Assignee: Fichtel & Sachs AG, Schweinfurt am Main, Germany

[22] Filed: Apr. 2, 1973

[21] Appl. No.: 347,159

Related U.S. Application Data
[63] Continuation of Ser. No. 245,313, April 19, 1972, abandoned.

[52] U.S. Cl................... 192/6 R, 192/64, 192/65, 192/41 R, 188/70 R
[51] Int. Cl............................................ F16d 67/02
[58] Field of Search............ 192/64, 65, 45.1, 41 R, 192/41 A, 97, 6 R; 188/70 R, 70 B

[56] References Cited
UNITED STATES PATENTS

| | | | |
|---|---|---|---|
| 2,707,108 | 4/1955 | Schottler | 192/65 X |
| 2,931,475 | 5/1960 | Humphrey | 192/30 X |

FOREIGN PATENTS OR APPLICATIONS

| | | | |
|---|---|---|---|
| 632,162 | 6/1936 | Germany | 192/41 R |
| 800,532 | 11/1950 | Germany | |

*Primary Examiner*—Benjamin W. Wyche
*Attorney, Agent, or Firm*—Hans Berman

[57] ABSTRACT

A releasable coupling, which may be a clutch or a brake, has a hollow outer member whose cavity is bounded by an inner, cylindrical wall. An inner coupling member has a carrier portion of a non-circular cross section perpendicular to the axis of the inner wall in the cavity. The carrier portion passes through a central opening in at least one generally elliptical and rigid coupling disc, the opening being dimensioned to prevent angular movement of the disc relative to the inner coupling member about the axis of the inner wall of the outer member, but to permit tilting movement of the disc in a plane which includes the axis of the outer member. Various tilting devices are disclosed for tilting the disc toward and away from a position of conforming, locking engagement with the inner wall of the outer coupling member. The device is a clutch when both coupling members are capable of rotation about the common axis, and a brake if one coupling member is held stationary. The use of the device for one or both purposes in a freewheeling bicycle hub equipped with a coaster hub is illustrated.

13 Claims, 6 Drawing Figures

PATENTED FEB 18 1975

COUPLING WITH TILTABLE ELLIPTICAL DISC

This is a continuation of application Ser. No. 245,313, filed Apr. 19, 1972, and now abandoned.

This invention relates to apparatus for releasably transmitting torque between two members of which at least one is capable of being rotated about an axis, and more specifically to a releasable coupling such as a clutch or a brake.

The invention is more specifically concerned with an improvement in the known type of coupling in which one of the input and output members is hollow and receives the other member in its cavity. The members are coupled to each other by means of a coupling element secured against rotation on the inner member and moved toward and away from locking engagement with the inner wall of the outer coupling member by forces axially acting on the coupling element. The known coupling element is a conical disc of resilient material which is radially expanded by axially applied pressure and contracts when the pressure is relaxed. Because of the need for employing a resilient material in the coupling element, the known coupling is limited in the magnitude of the torque that may be transmitted by the coupling and in its useful life span when transmitting torque approaching the otherwise permissible limit.

The primary object of the invention is the provision of a releasable coupling of the type described which does not rely on resilient deformation of a coupling element for its operativeness.

The coupling of the invention, in its more specific aspects, provides a coupling including a first member which has an inner wall of circular cross section about an axis, the wall bounding a cavity in the first member. A substantially rigid disc member is secured in the cavity on a second member against angular movement relative to the afore-mentioned axis while being capable of tilting movement in a plane including the axis.

Tilting means are provided for tilting the disc member in the plane away from the axis into a position of locking engagement with the inner wall of the first member, and toward the axis out of the locking position. One of the first and second members is arranged to be rotated about the axis by a drive.

Other features, additional objects, and many of the attendant advantages of this invention will readily be appreciated as the same becomes better understood from the following detailed description of preferred embodiments when considered in connection with the appended drawing in which.

Figure 1:
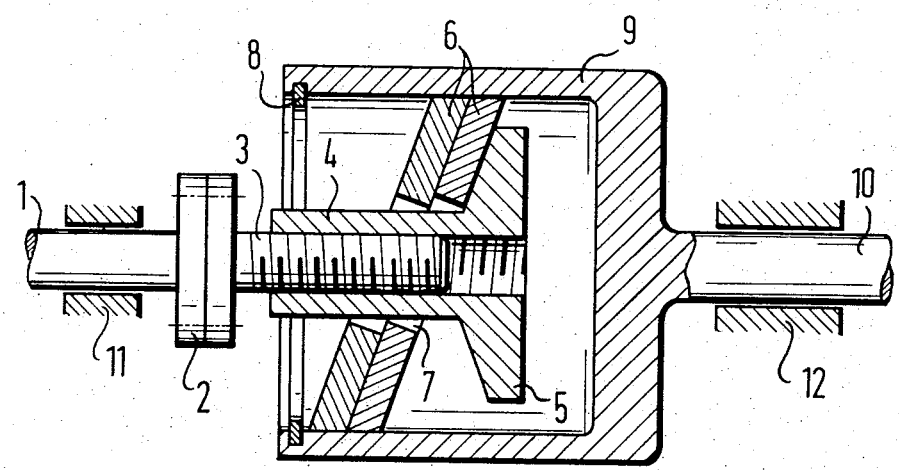
FIG. 1 shows a coupling of the invention in elevational section on its axis of rotation.

Referring now to the drawing in detail, and initially to FIG. 1, there is seen a coupling of the invention which operates as an overrunning clutch.

A drive shaft 1 is fixedly fastened by connected flanges 2 to the coaxial input shaft 3 of the clutch. External threads on the shaft 3 are matingly engaged by internal threads on a heavy carrier bar 4 of square cross section which is symmetrical relative to the axis of its threads, and whose end remote from the flanges 2 carries an integral flywheel 5 having a radial end face perpendicular to the axis of rotation of the shaft 3 and an annular conical face directed toward the flanges 2 and inclined relative to the radial end face at an angle of 20±5°.

Two elliptical coupling discs 6 have respective central, rectangular, elongated openings 7. As will presently be described with reference to FIG. 4, the openings 7 receive the square bar 4 with minimal clearance in a direction perpendicular to the plane of FIG. 1, but with sufficient clearance in the drawing plane to permit some tilting movement of each disc 6 in this plane about an axis perpendicular to the axis of rotation of the shafts 1, 3.

In the illustrated position, an outer edge portion of one disc 6 axially abuts against a snap ring 8 partly recessed in the rim of the cup-shaped output member 9 of the clutch which is coaxial with the shafts 1, 3, and whose cavity receives the flywheel 5, the discs 6, and most of the bar 4 and the shaft 3. A shaft 10, integral with the output member 9 and coaxial with the shafts 1, 3 projects from the outer face of the cup bottom. Bearings 11, 12 of a stationary supporting structure, not otherwise shown, rotatably receive the shafts 1, 10.

The inner axial face of the output member 9 is cylindrical, and the circumferential edges of the discs 6 are obliquely inclined relative to the broad, parallel faces of the discs for conforming engagement with the inner face of the output member 9. The threads which connect the bar 4 to the shaft 3 have a very small pitch and have little friction.

When the shaft 1 is driven in one direction, the inertia of the bar 4 and of the flywheel 5 causes the shaft 3 to move threadedly inward of the bar 4, and the bar together with the flywheel 5 is thereby drawn toward the flanges 2. The discs 6 are tilted counterclockwise as viewed in FIG. 1 by the flywheel 5 approaching the snap ring 8 so as to wedge between the bar 4 and the output member 9 and to prevent further threaded movement of the bar 4 relative to the shaft 3. The bar 4 now turns with the shaft 3. The discs 6 are secured against angular movement relative to the bar about the axis of rotation and transmit torque from the bar 4 and the shafts 1, 3 to the output member 9. The shaft 10 is driven.

When the shaft 1 thereafter is driven in the opposite direction, the flywheel 5 is moved away from the flanges 2 when the threaded shaft 3 starts turning in the bar 4, and the increasing axial distance between the abutments provided by the snap ring 3 and the conical engaging face of the flywheel 5 permits the discs 6 to tilt out of their position of locking engagement with the inner wall of the output member 9 toward the axis of the clutch, and the shaft 10 and a connected load, not shown, remain stationary.

If the shaft 10 turns faster than the shaft 1 in a direction in which the shaft 1 could drive the shaft 10 through the discs 6, frictional engagement between the inner wall of the output member 9 and the discs 6 causes the bar 4 to move threadedly on the shaft 3 in a direction to move the flywheel 5 away from the flanges 2 until the clutch is disengaged when the friction between the discs 6 and the clutch member 9 becomes insignificant.

The entire apparatus shown in FIG. 1 is preferably made of steel, and the discs 6 and the inner wall of the member 9 are preferably case hardened. The thickness of a disc 6 of hardened steel may be as small as 3mm without permitting significant elastic deformation of the disc in normal service, and the torque transmitting capacity of the clutch may be increased by using more than two discs 6 as will be shown with reference to other embodiments of the invention. A single disc 6 may be sufficient under appropriate operating conditions.

Figure 4:
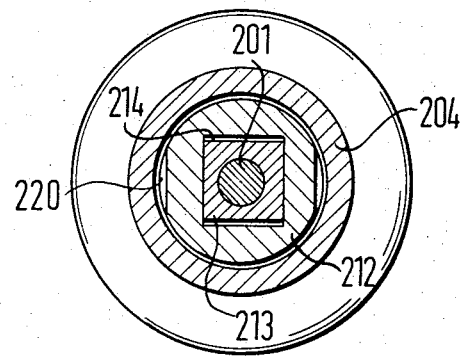
FIG. 4 is a section of the hub of FIG. 3 taken on the line IV—IV.

As is not explicitly shown in FIG. 1, but will be understood by analogy with FIG. 4, the minor axis of the ellipse defined by the narrow circumferential face of each disc 6 is equal to or only very slightly smaller than the diameter of the inner wall in the coupling member 9, while the diameter is significantly smaller than the major axis of the ellipse. The circumferential face itself is obliquely inclined relative to the two major, parallel faces of the disc over much of the disc circumference in such a manner that area contact can be established between the circumferential face and the coupling member 9 in the position of locking engagement. In that position, a major face of the disc 6 nearest the flywheel 5 engages the flywheel along a line extending from the square carrier portion of the bar 4 to the outer circumference of the flywheel. The major faces of the discs thus also are inclined at an angle of 20±5° to the radial end face of the flywheel, or at an angle of 70±5° relative to the axis of rotation.

The conforming engagement between the bar 4 and the discs 6 in the openings 7 of the latter is necessary for reliable torque transmission by the discs, and a square bar 4 and a rectangular opening 7 are machined with the necessary precision at very low cost. It would be equally simple to machine the bar 4 to an elongated, rectangular cross section, but assembly of the bar with the discs 6 is simplified by the square shape which has no offsetting disadvantages and is dynamically well balanced. It will be appreciated, however, that the bar could perform its function if it had any non-circular shape so that its outer face portion would cooperate with a suitably shaped opening in each disc 6 to secure the disc against angular movement on the bar relative to the axis of the clutch while permitting tilting movement of the disc in the plane of FIG. 1 which includes the axis.

The illustrated arrangement meets this requirement in the most simple manner. However, the discs 6 may be tiltably secured against rotation on the bar 4 by many other devices, obvious to a skilled mechanic, but more complex and hence less desirable.

Figure 2:
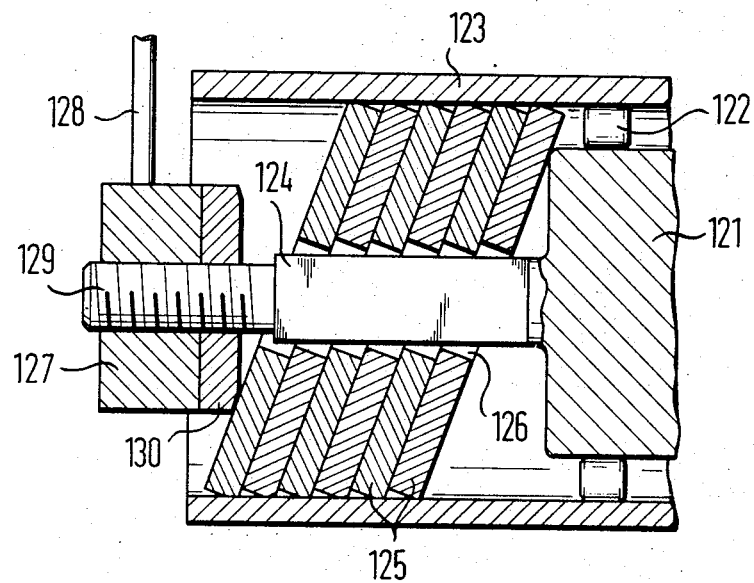
FIG. 2 illustrates a brake according to the invention in elevational section on the axis of rotation of the moving element to be braked.

FIG. 2 shows a brake arrangement based on the same principle of operation as the clutch of FIG. 1. A stationary, cylindrical support 121 is provided with circumferentially distributed antifriction bearings 122 which carry a tubular shaft 123 coaxial with the support 121. The support is integral and coaxial with a carrier bar 124 passing through central, rectangular, elongated openings 126 in a stack of six coupling discs 125 in the manner described with reference to FIG. 1. The discs 125 are elliptical and differ from the afore-described discs 6 only in the configuration of their circumferential faces. Each face has two angularly offset axial portions, only one portion making area contact with the inner cylindrical wall of the hollow shaft 123 into the position of locking engagement.

The discs 125 are tilted relative to the axis of rotation of the shaft 123 into and out of engagement with the shaft by a heavy nut 127 operated by means of a radial arm 128 outside the cavity of the shaft 123. The nut 127 threadedly engages the free, reduced end 129 of the stationary bar 124. A beveled outer edge of a washer 130 backed by the nut 127 axially shifts the stack of discs 125 toward the support when the nut 127 is suitably turned.

The washer 130, when moved toward the stack, engages a portion of the nearest disc 125 which is remote from the axis of rotation of the shaft 123, and causes abutting engagement of a similarly remote portion of the farthest disc with an edge of the support 121. Because of the mechanical advantage thus achieved, a relatively small axial force need be exerted by the nut 127 for tilting the stack of discs 125 into the locking position in which the shaft 123 is coupled to the stationary support 121 and thereby braked to a standstill together with a connected load or other machine element, not shown, which drives the shaft. The specific configuration of the circumferential disc faces causes gradual engagement of the brake.

The brake is released by turning the nut 127 in a direction to move the washer 130 away from the support 121, as will be obvious from the description of the clutch of FIG. 1.

Figure 5:
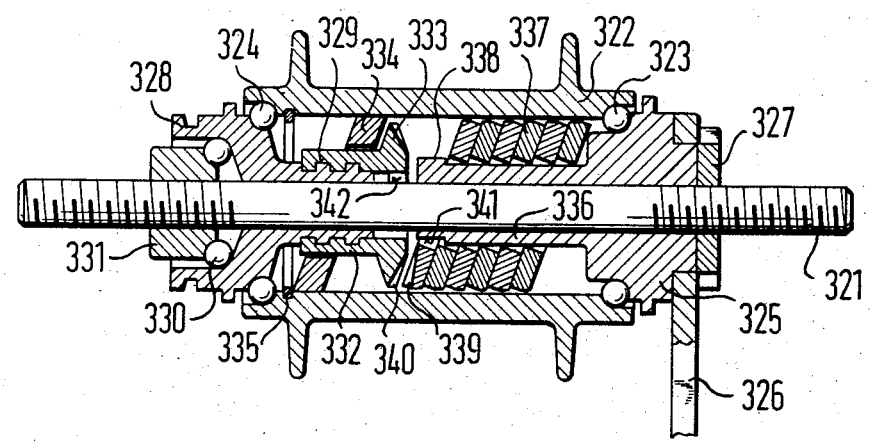
FIGS. 5 and 6 illustrate freewheeling hubs including both drive couplings and brakes according to the invention in views corresponding to that of FIG. 3.
Figure 6:
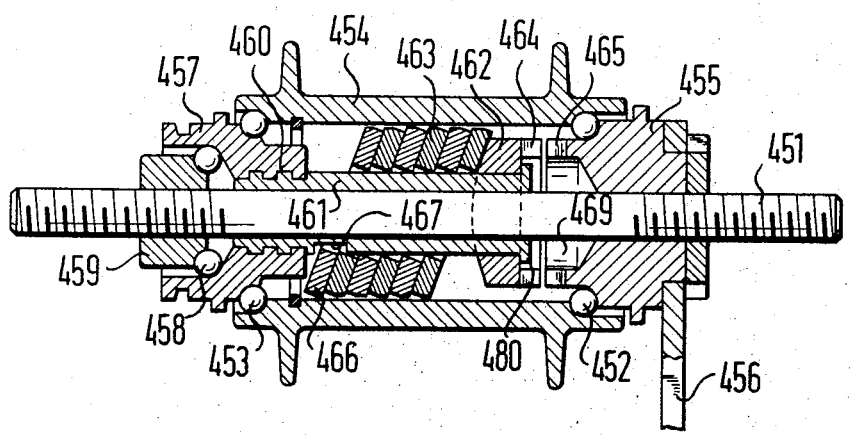

Clutches and brakes of the invention require little space and are otherwise eminently suitable for use in the rear wheel hub of a bicycle or like vehicle which requires an overrunning clutch for freewheeling, and is preferably equipped with a coaster brake actuated by back pedalling. Respective examples of such hubs are shown in FIGS. 3, 5, and 6.

Figure 3:
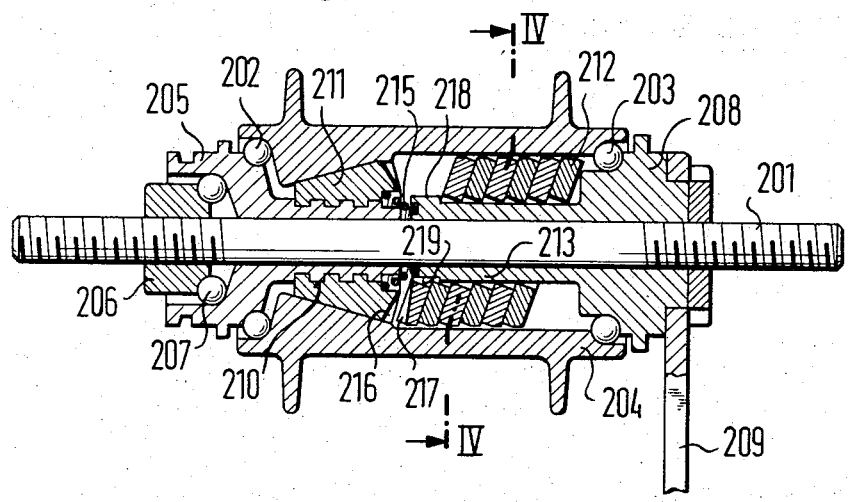
FIG. 3 is an axially sectional front elevation of the freewheeling rear hub of a bicycle including a coaster brake according to the invention.

The bicycle hub illustrated in FIG. 3, also seen in radial section in FIG. 4, has a shaft 201 normally stationary in the non-illustrated bicycle frame. Axially spaced ball-bearings 202, 203 support the shell 204 of the hub for rotation about the axis of the shaft 201. A tubular driver 205 provides an inner race for the ball bearing 202 and is supported on a bearing ring 206 by means of another ball bearing 207, the bearing ring 206 being threadedly adjustable on the shaft 201, but normally fixed. Another bearing ring 208 on the shaft 201 supports the bearing 203. The bearing ring 208 is safely secured against rotary movement on the shaft 201 in the installed condition of the hub by a partly radial arm 209 fastened to the rear fork of the bicycle frame in a manner conventional in itself and not shown.

The portion of the driver 205 which axially projects from the hub shell 204 normally carries a sprocket for connection to the bicycle pedals by a link chain. The tubular, cylindrical portion of the driver 205 in the hub shell carries shallow threads 210 matingly engaged by internal threads of a drive conus 211. The outer conical face of the conus 211 is axially coextensive with a correspondingly conical engagement face on the inner wall of the hub shell 204.

A stack of coupling discs 212 is arranged on an integral tubular carrier portion 213 of the bearing ring 208 which extends inward of the hub cavity close to the driver 205. The carrier portion 213 passes through elongated, rectangular openings 214 of the six discs 212 in the manner and for the purpose described with reference to FIG. 2.

As is evident particularly from FIG. 4, the carrier portion 213 is of square cross section, and its horizontal width, as viewed in FIG. 4, matches the corresponding dimension of the openings 214 with a sliding fit. The vertical height of the portion 213 is slightly smaller than the height of the openings 214 even when the openings are projected into the vertical plane of FIG. 4.

Perspective shortening also causes the circumference of the disc 212 seen in FIG. 4 to appear circular whereas it actually is elliptical over most of its length, flats 220 being formed on parts of the circumference connected by the minor axis of the ellipse to permit lubricant to flow along the stack of discs 212. Except for the flats 220, the disc 212 conformingly engages the inner wall of the hub shell 204 which is cylindrical in its portion axially coextensive with the stack of discs 212.

Reverting to FIG. 3, the free end of the carrier portion 213 has an integral radial projection 218 and a radial recess 219 diametrically opposite the projection 218. The projection axially secures the discs 212 on the carrier portion 213, and the recess 219 permits the discs to be slipped over the projection during assembly of the hub.

Radial, circumferentially alternating projections and recesses 216 on the end face of the drive conus 211 and similar projections and recesses 217 on the coupling disc 212 nearest the conus may be engaged and disengaged by axial movement of the conus. A friction spring 215 frictionally connects the conus 211 to the stationary shaft 201 and impedes rotation of the conus with a force sufficient to prevent rotation of the conus by friction in the threads 210.

When the driver 205 is turned about the hub axis by back-pedalling, the conus 211 moves axially away from the bearing 202 as its rotation is impeded by the spring 215. Rotation is entirely prevented as soon as the projections and recesses 216, 217 are engaged. The discs 212 are tilted in the plane of the drawing between the conus 211 and a shoulder of the bearing ring 208 remote from the axis of rotation, and the hub shell 204 is braked by engagement with the discs.

When the driver 205 is turned in the normal direction, the conus 211 moves into engagement with the conical inner wall of the hub shell 204 to drive the latter.

The bicycle hub illustrated in FIG. 5 is mounted on a normally stationary shaft 321 coaxial with the hub shell 322 whose two axial ends roll on respective ball bearings 323, 324, the inner race for the ball bearing 323 being provided by a bearing ring 325 whose angular position is secured by an arm 326 normally attached to the non-illustrated rear fork of the bicycle frame, as described with reference to FIG. 3. The ring 325 is further secured by an internally threaded disc 327.

A driver 328, which carries the bearing 324, has a generally cylindrical, tubular portion within the shell 322 provided with shallow threads 329. The driver 328 is mounted on the shaft 321 by means of a ball bearing 330 and a bearing ring 331 fixed on the shaft 321.

An internally threaded sleeve 332 engages the threads 329 and is of square external cross section. It terminates in an annular abutment 333 similar in configuration to the flywheel 5 described with reference to FIG. 1. A single, elliptic coupling disc 334, closely similar to the afore-described discs, is mounted on the square portion of the sleeve 332 in such a manner that it is secured against angular movement on the sleeve about the hub axis, but may be tilted toward and away from the hub axis into and out of locking engagement with the enveloping cylindrical inner face of the hub shell 322. The disc is axially confined between the abutment 333 and a snap ring 335 on the inner face of the hub shell 322 closely adjacent the ball bearing 324. A friction element 342 couples the sleeve 332 to the shaft 321 and impedes rotation of the sleeve with the driver 328.

A tubular carrier portion 336 of the bearing ring 325 in the hub shell 322 is substantially identical with the carrier portion 213 described with reference to FIG. 3, and carries a stack of coupling discs 327 held in place during assembly of the hub by a projection 338 on the innermost part of the carrier portion 336 which is also provided with a radial recess 339 diametrical opposite the projection for the purpose described with reference to FIG. 3.

Circumferentially alternating projections and recesses 340 on the annular abutment 333 may be engaged with mating projections and recesses 341 on the nearest disc 337 when the sleeve 332 is shifted toward the right from the position shown in FIG. 5.

When the driver 328 is turned by normal pedalling, the sleeve 332 moves toward the left from the illustrated position until the disc 334 is locked to the hub shell 322 so that further movement of the sleeve 332 on the threads 329 is prevented. The driver 328, the sleeve 332, the disc 334, and the hub shell 322 turn in unison as soon as the disc is sufficiently tilted by simultaneous engagement with the abutment 333 and the snap ring 335 by axial movement of the abutment 333 toward the snap ring 335.

During back-pedalling, the sleeve 332 moves away from the snap ring 335 and permits the disc 334 to tilt toward the hub axis so as to release the hub shell 322. The stack of discs 337 is thereafter compressed between the abutment 333 and a shoulder of the bearing ring 325 until the discs lockingly engage the internal, cylindrical wall of the hub shell 322 and brake the same to a standstill, if so desired. The sleeve 332 moves axially on the threads 329 as its rotation is initially impeded by friction between the disc 334 and the inner shell wall, and thereafter prevented by engagement of the projections and recesses 340, 341, the discs 337 being prevented from rotation about the hub axis by their fit with the square outer face of the carrier portion 336 of the stationary bearing ring 325.

A brake is not normally needed to interfere with free rotation of the sleeve 332 with the driver 328, but may be provided in a manner obvious from the showing of the spring 215 in FIG. 3 to prevent brake engagement during freewheeling.

In the bicycle hub illustrated in FIG. 6, the clutch and brake functions are combined in a single stack of coupling discs.

The illustrated hub has a stationary shaft 451 and axially terminal ball bearings 452, 453 supporting a hub shell 454 for rotation about the shaft axis. A bearing ring 455 is secured against angular movement on the shaft 451 by an arm 456, as described above, and supports the bearing 452. A driver 457 carries the bearing 453 and is supported on the shaft 451 by another ball bearing 458 and a bearing ring 459 fixed on the shaft.

Shallow internal threads 460 connect the driver 457, which is axially secured by the bearings 453, 458, to a long sleeve 461 rotatable on the outer face of the shaft 451 with some friction. Except for the threaded portion, the sleeve 461 is of square outer cross section. An abutment ring 462 having a square central opening is axially slidable on the end of the sleeve 461 remote from the threads 460 and retains a stack of six discs 463, 466 which are secured on the sleeve 461 against rotation about the hub axis and tiltable toward and away from a position of locking engagement with the inner, cylindrical wall of the hub shell 454 in the manner common to all illustrated embodiments of the invention.

Claws or teeth 464 circumferentially distributed on the abutment ring 462 axially project toward corresponding claws or teeth 465 on the bearing ring 455. An integral collar 480 on the sleeve 461 prevents the abutment ring 462 from slipping off the sleeve 461.

The five discs 463 near the ring 462 are identical and not significantly different from the afore-described discs 337. The sixth disc 466 nearest the threads 460 has a somewhat smaller, central, rectangular opening and is mounted on an axial portion of the sleeve 461 whose cross section is correspondingly reduced by a radial recess 467.

The face of the bearing ring 455 directed toward the abutment ring 462 is formed with a central recess 469 of sufficient size to receive the end of the sleeve 461 and the collar 480 on the same while the teeth 464, 465 on the rings 462, 455 are engaged to prevent rotation of the ring 462, of the sleeve 461, and of the discs 463, 466.

During normal pedalling, the sleeve 461 is axially moved toward the left, as viewed in FIG. 6, by its threaded engagement with the driver 457 and the friction fit on the shaft 451. The first and last discs 463, 466 engage the abutment ring 462 and the driver 457 respectively, and the discs are tilted until they lockingly engage the hub shell 454, thereby preventing further axial movement of the sleeve 461, and causing the sleeve and the hub shell to rotate jointly with the driver 457.

During back-pedalling, the sleeve 461 is moved toward the right until the teeth 464, 465 are engaged, whereupon no further rotation of the sleeve 461 is possible. The collar 480 and the axially adjacent portion of the sleeve 461 enter the recess 469, leaving the position of the abutment ring 462 unchanged. The disc 466 has only limited freedom of axial movement in the recess 467 of the sleeve 461. The five discs 463 are thus compressed between the disc 466, which moves with the sleeve 461, and the stationary abutment ring 462, and thereby tilted away from the hub axis and into engagement with the inner wall of the hub. The sleeve 461 being locked to the bearing ring 455 and further to the bicycle frame by the arm 456, the hub shell is being braked by the engaged discs 463 and the disc 466 which must tilt with the other discs in the stack.

If so desired, the recess 467 may be replaced by a spring clip on the sleeve 461 which engages the last disc in the stack and can shift it toward the abutment ring 462. In this obvious modification of the hub of FIG. 6, all coupling discs may be identical.

It should be understood, of course, that the foregoing disclosure relates only to preferred embodiments of the invention, and that it is intended to cover all changes and modifications in the examples of the invention herein chosen for the purpose of the disclosure which do not constitute departures from the spirit and scope of the invention set forth in the appended claims.

What is claimed is:

1. A wheel hub for a bicycle and like vehicle comprising, in combination:
   a. a normally stationary shaft having an axis;
   b. a hub shell mounted for rotation about said axis and having an inner wall about said axis;
   c. a driver rotatable about said axis in an axially fixed position, said driver having respective axial portions in said hub shell and projecting from said hub shell;
   d. a tubular carrier member receiving a portion of said shaft in said shell;
   e. first securing means for securing said carrier member against rotation about said axis;
   f. a substantially rigid disc member;
   g. second securing means securing said disc member on said carrier member against rotation on said carrier member about said axis while permitting tilting movement of said disc member in a plane including said axis toward and away from a position of locking engagement of said disc member with said inner wall; and
   h. tilting means for tilting said disc member in said plane, said tilting means including
      1. first abutment means axially secured relative to said shaft,
      2. second abutment means, said first and second abutment means being offset from said disc member in opposite axial directions and from said axis in opposite radial directions for engagement with said disc member, and
      3. threaded means threadedly connecting said second abutment means to said driver for axially moving said second abutment means toward and away from said first abutment means when said driver rotates about said axis in respective directions.

2. A coupling as set forth in claim 1, wherein said disc member has a thickness much smaller than the length and width thereof and two major faces separated by said thickness and extending each in the direction of said length and width, one of said major faces defining an angle of 65° to 75° in said plane with said axis in said position of locking engagement.

3. A wheel hub as set forth in claim 1, wherein said disc member is formed with a non-circular opening extending therethrough and receiving said carrier member, the cross section of said carrier member at right angles to said axis being non-circular, and respective opposite faces of said carrier and of said disc member in said opening constituting said second securing means.

4. A coupling as set forth in claim 3, wherein said disc member has a circumferential face substantially defining an ellipse centered in said opening, said inner wall is cylindrical and has a diameter approximately equal to the minor axis of said ellipse and smaller than the major axis of said ellipse, said circumferential face engaging said inner wall in said position of locking engagement.

5. A wheel hub as set forth in claim 1, wherein said second abutment means include an abutment member having a face conical about said axis and tapering axially away from said first abutment means, said inner wall having a face portion shaped for conforming torque transmitting engagement by said tapering face of said abutment member when said second abutment means is moved away from said first abutment means, said threaded means including threads on said abutment member engaging mating threads on said driver.

6. A coupling as set forth in claim 5, further comprising means for impeding joint rotation of said abutment member with said driver.

7. A wheel hub as set forth in claim 5, wherein said disc member and said abutment member have axially opposite faces respectively formed with an axial projection and an axial recess positioned for receiving said projection and for thereby preventing rotation of said abutment member in said position of locking engagement.

8. A wheel hub as set forth in claim 1, further comprising a second disc member axially spaced from said first-mentioned disc member, said second abutment means including an abutment member, said threaded means including threads on said abutment member engaging mating threads on said driver, said second disc member being formed with a non-circular opening extending therethrough, and said abutment member having a sleeve portion received in said opening of the second disc member, the cross section of said sleeve portion at right angles to said axis being non-circular, and respective opposite faces of said sleeve portion and of said second disc member in said opening of the latter securing said second disc member against angular movement on said sleeve portion relative to said axis while permitting tilting movement of said second disc member toward and away from a position of locking engagement of said second disc member with said inner wall, third abutment means axially secured relative to said shaft and axially offset from said second disc member in a direction away from said first abutment means, said abutment member having two abutment faces respectively engaging said first-mentioned disc member and said second disc member in response to rotation of said driver in opposite directions.

9. A wheel hub as set forth in claim 8, wherein said two abutment faces abuttingly engage respective portions of said disc members radially offset from said axis in opposite directions in response to said rotation of said driver.

10. A wheel hub as set forth in claim 1, wherein said second abutment means include an abutment member mounted on said carrier member for axial movement therewith in one axial direction, said threaded means including threads on said carrier member threadedly connecting said carrier member to said driver for axially moving said carrier member relative to said driver when said driver rotates relative to said carrier member.

11. A wheel hub as set forth in claim 10, wherein said second abutment means include engaging means fixed on said carrier member for engaging said abutment member and for moving the same in said one axial direction with said carrier member when said carrier member moves in said one axial direction, while permitting said abutment member to move relative to said carrier member in said one axial direction.

12. A wheel hub as set forth in claim 11, wherein said engaging means include means preventing relative angular movement of said abutment member and said carrier member, and said first securing means include means preventing relative angular movement of said carrier member and of said shaft in response to movement of said abutment member in an axial direction opposite to said one axial direction.

13. A wheel hub as set forth in claim 12, wherein said tilting means further include third abutment means on said carrier member offset from said disc member in an axial direction away from said second abutment means.

* * * * *

UNITED STATES PATENT OFFICE
CERTIFICATE OF CORRECTION

Patent No. 3,866,726          Dated February 18, 1975

Inventor(s) OSKAR ARENZ

It is certified that error appears in the above-identified patent and that said Letters Patent are hereby corrected as shown below:

In the heading, after line [21], insert --

[30] Foreign Application Priority Data

April 23, 1971    Germany .......... P 21 19 825.4
    April 23, 1971    Germany .......... P 21 19 826.5 --

Signed and sealed this 15th day of April 1975.

(SEAL)
Attest:

RUTH C. MASON
Attesting Officer

C. MARSHALL DANN
Commissioner of Patents
and Trademarks